Dec. 7, 1965   W. SCHWARTZ   3,222,675
MEANS FOR POSITIONING A PLURALITY OF ELEMENTS IN ORBIT ABOUT A
CELESTIAL BODY
Filed Dec. 14, 1959   2 Sheets-Sheet 1

WALTER SCHWARTZ
INVENTOR.

BY George C. Thompson
agent
Morris Spector
ATTORNEY

United States Patent Office 3,222,675
Patented Dec. 7, 1965

3,222,675
MEANS FOR POSITIONING A PLURALITY OF ELEMENTS IN ORBIT ABOUT A CELESTIAL BODY
Walter Schwartz, Northridge, Calif., assignor to TRW Inc., a corporation of Ohio
Filed Dec. 14, 1959, Ser. No. 859,533
10 Claims. (Cl. 343—18)

This invention relates to a means for placing material into an orbit and more particularly to a means for controlling the positioning of microwave reflectors in an orbit about a celestial body.

For many years, it has been known that the ionosphere could be used to reflect radio waves back towards the surface of the earth. As the frequencies increased and the wavelength became shorter a point was reached at which radio wave reflection ceased to be effective. As a result, it has been suggested that a belt of dipoles or reflectors be provided in orbit about the earth for providing high frequency signal reflection.

It is, therefore, an object of this invention to provide a means for controlling the placement of a plurality of elements to form a toroidal band about a celestial body.

It is another object of this invention to provide a dipole dispenser capable of controlled distribution of the dipole reflectors.

It is another object of this invention to provide a high frequency reflector dispenser capable of surface sublimation.

It is another object of this invention to provide a dipole dispenser capable of forming a toroid reflector band of controlled cross-sectional area.

Other objects, purposes and characteristic features will become obvious as the description of the invention progresses.

In practicing this invention, in one embodiment there is provided a controlled dispenser in the form of a geometrical mass, formed with reflectors distributed therein, capable of providing all necessary accelerations of individually dispensed reflectors to produce a substantially evenly distributed band of reflectors orbiting about a celestial body.

In each of the views similar parts bear like reference characters.

Figure 1:
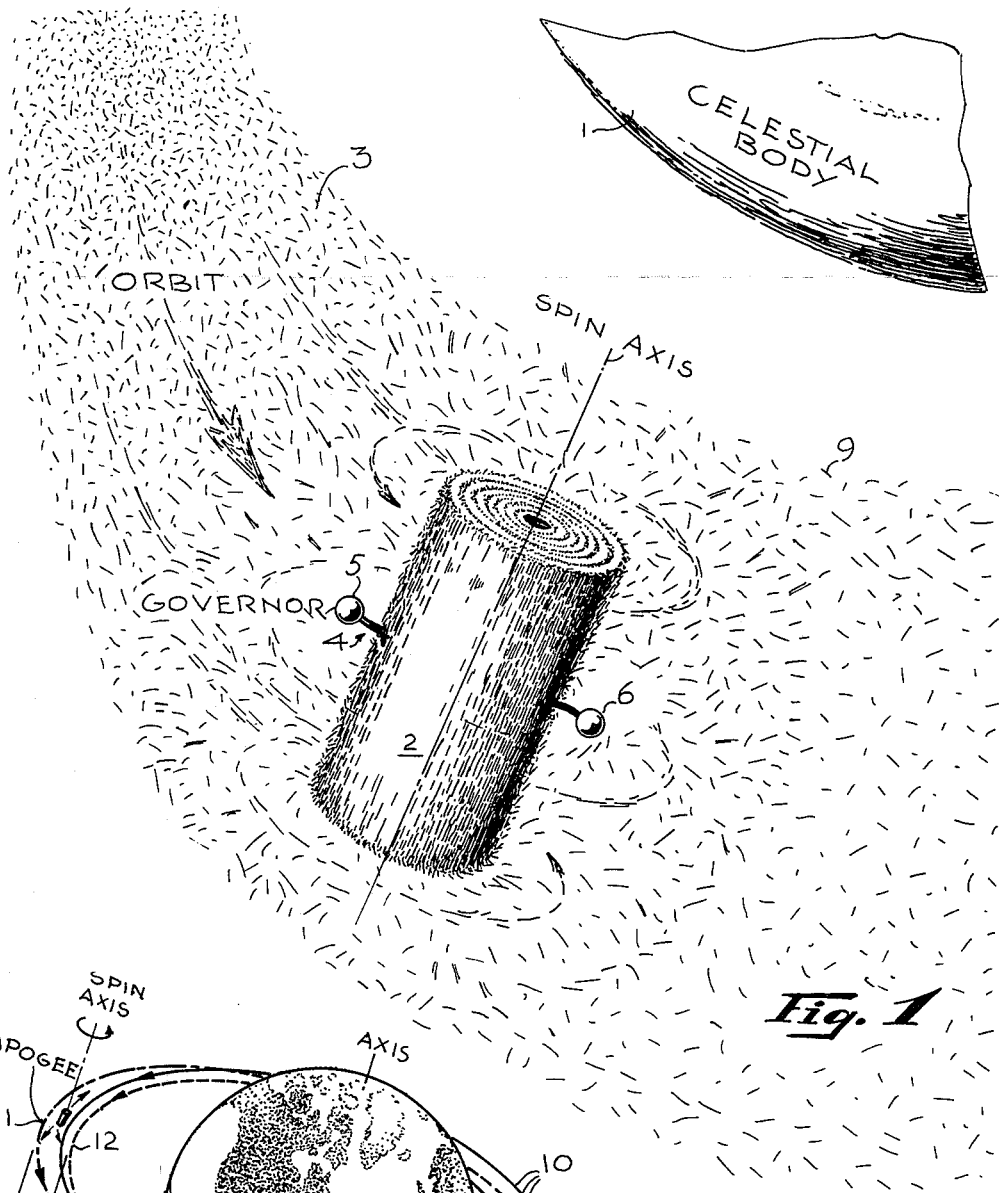
FIGURE 1 illustrates one embodiment of a cylindrical mass of dipoles in an orbit about the celestial body.

In FIGURE 1, there is illustrated a large body such as the earth 1 having placed in orbit thereabout a mass 2 (shown in cylindrical form) comprising a plurality of microwave reflectors capable of being dispensed individually in an orbit such as an orbit 3 about the earth 1. The mass 2 may take any suitable dispensing shape such as cylindrical which can also comprise a governor control means or device, such as a well known flyball type 4 comprising a pair of governor masses 5 and 6 capable of being positioned at varied distances from the center of the mass 2 in response to the speed of rotation of the mass 2. For convenience the mass is shown and will be described as a cylinder which is the preferred form. The governor masses 5 and 6 are supported on arms 5a and 5b and 6a and 6b, respectively. The arms 5a and 5b are hingedly connected to the rings 7 and 8, respectively, which are slidable along a support 4c when the governor masses 5 and 6 move in or out depending upon the speed of rotation. The governor masses 5 and 6 are then biased toward the center of the cylinder mass 2 by suitable springs 4a and 4b. The governor control is accomplished through governor mass position with respect to the center of rotation of the cylindrical mass 2. The governor masses do not control the propelling force of the cylindrical mass 2 but merely control mass rotation through their changing radii of gyration. It can be seen, therefore, that the cylinder mass 2 will rotate at constant r.p.m. controlled by the governor 4, while dispensing microwave reflectors in the orbit 3 in a manner explained hereinafter.

The structure of this invention provides a dispenser of radio signal or microwave reflectors or dipoles 9 which are secured in the cylindrical mass form 2 by a suitable binding material 2a such as maleic anhydride, ice, Dry Ice, wax, camphor, naphthalene or any other solid material that changes from a solid to a gaseous state at the equilibrium temperature of the surface of the solid mass when the mass is in orbit, thus providing a controlled release of the dipoles 9. The binding material 2a used for retaining the dipoles, or other devices in the cylindrical mass form 2 for release in the orbiting belt, is capable of controlled change of state (sublimation) from a solid to the gaseous state along its surface in response to the heat of the sun's rays and in the presence of low atmospheric pressure in space. The dipoles 9 can be formed of any suitable material such as aluminum, copper, tungsten, steel or any other substance such as electrically reflective plastic cut to the proper length, for example a half wavelength, and constructed of a desirable thickness for packaging, while still providing a good reflective element. Although the disclosure has been directed to the placement of reflector elements into orbit, it should be clear that any substance may be placed into orbit such as gravel or sand for other uses. The dispensing of a final product of gas in an orbit can be provided by the sublimation process (solid to gas change of state) and the controlled spin velocity.

The recitation of aluminum strips as the reflector element is desirable from the standpoint of the number of elements that can be placed in the cylinder. However, this desirability may give way to heavier type dipoles since it is known that the life of the element in orbit is limited by the solar pressure the relative effect of which decreases as the weight of the element increases. Some "happy medium" between the number of reflector elements and the mass of reflector elements would probably be used for the greatest utilization. In one such dipole cylinder arrangement, aluminum strips were used and found to be capable of containment within a mass containing 5.5 million dipoles or strips to the pound. Using this figure it has been determined for one particular application approximately 200 pounds of dipoles are desired to circumvent the earth around the equator at an average orbital elevation of 2,000 miles. With the dipoles placed in a solid retainer material formed into a cylindrical shape such as the mass 2 and launched into orbit with a spinning as well as an orbital velocity, it can be seen that as the outer layer of the solid retainer sublimates releasing the dipoles in the surface area the dipoles are dispensed at a velocity equal to the peripheral speed of the cylinder 2 with the governor 4 maintaining a constant r.p.m. or, in other words, a controlled solid mass rotational velocity. The dipole velocity is vectorially added to the mass 2 orbital velocity thus providing controlled distribution. The mass 2 r.p.m. can therefore be used to control the cross-sectional area of the orbital belt. It is obvious that the dipoles will be dispensed at a decreasing velocity as the mass decreases in size. This action further aids the dipoles in distributing themselves relatively evenly throughout an orbital belt about the celestial body around which the cylinder is launched.

Figure 2:
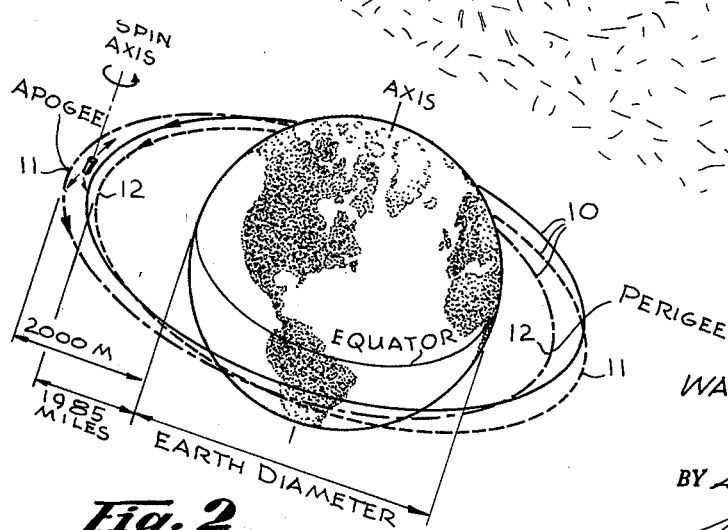
FIGURE 2 illustrates the orbital placement of the dipoles for a desired zone size about a celestial body.

FIGURE 2 illustrates several orbital paths 10 of different dipoles or reflectors which have been released from the mass 2 at different points and different vector velocities within the orbit of the cylindrical mass 2. For this reason, each reflector or dipole assumes its own orbit with a different apogee 11 and perigee 12 for each. The cross-sectional area of the band formed by the dispensed dipoles is established by the velocity imparted to each reflector or dipole as it is released from the dispensing cylindrical mass 2. The smaller the cross-sectional area of the band, the longer dispersion time required for even distribution of the reflectors since each reflector is dispensed from the cylindrical mass 2 at more nearly the same velocity as the next. If the cylindrical mass 2 is rotating rapidly about its spin axis, an increase in cross-sectional area of the reflector band as well as a decrease in dispersion time (due to higher cylinder tangential velocity) is provided. Since the cylinder will most probably tumble, as well as spin about its axis, a greater variety of reflector orbital paths occur, thus providing for even better distribution.

In the illustration of FIGURE 2, a band is shown formed with the apogee of the farthest dipole or reflector being 2000 miles from the earth and the perigee of the nearest reflector being 1985 miles from the earth. These distances were selected as typical illustrative distances and are not intended to be restrictive as to the orbital distances to be used. The life of the reflector band established is naturally dependent upon the perigee of the reflectors.

Figure 3:
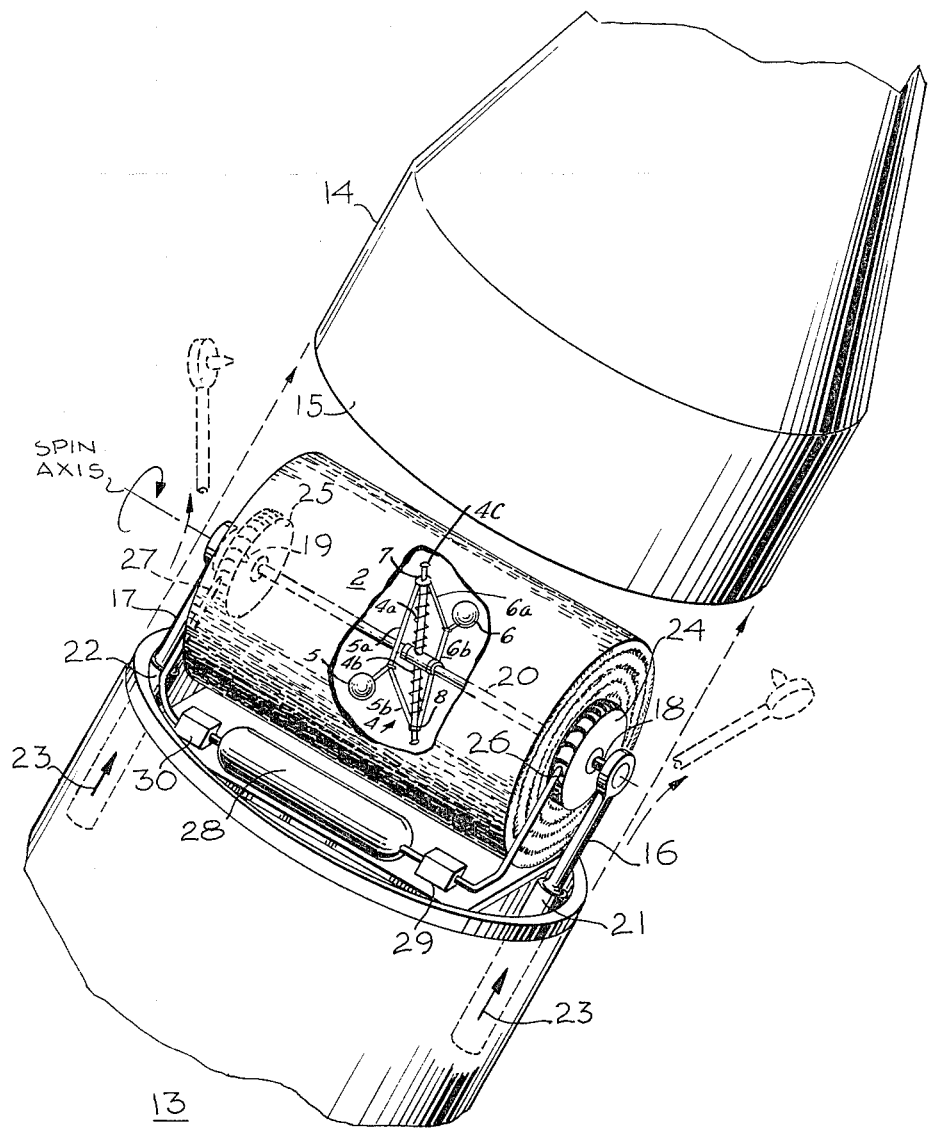
FIGURE 3 is a partially exploded view of a cylindrical mass in place on a launching rocket vehicle.

FIGURE 3 illustrates one of many possible methods of placing the typical dipole cylinder 2 into the orbit 3. In this view a rocket 13 provides means for disposing the cylindrical mass 2 in a position whereby the cylindrical mass may be subjected to a change in environment and is propelled into orbit 3 by a suitable propulsion system (not shown) and a nose-cone 14 ejected by any suitable well known method (not shown). Within the nose-cone 14 there is provided a chamber 15 capable of enclosing the cylinder 2 in proper position and in a stable environment during rocket launching and up to subsequent ejection of the nose-cone 14 at which time the cylindrical mass 2 is subjected to the changed environment. The cylindrical mass 2 is held on suitable arms 16 and 17 having pivot pins 18 and 19 respectively, capable of being received in ends of a center core 20 of the cylindrical mass 2. The arms 16 and 17 are slidably received within guide tracks 21 and 22 capable of providing guided cylindrical mass 2 movement into release position shown by the dotted position of arms 16 and 17. The movement of the arms and cylindrical mass is in response to a suitable propulsion (not shown) such as explosive charges in the portions 23 of the tracks 21 and 22. Prior to the movement of arms 16 and 17 into outward positions shown in dotted form, the cylindrical mass 2 is provided with rotary spin motion through suitable air vane wheels 24 and 25 journalled in the pivots 18 and 19, respectively and connected to the core 20 of the cylinder 2. Positioned adjacent the air wheels 24 and 25 is a pair of jets 26 and 27 selectively provided with air under pressure from a suitable air source 28. The source 28 is controlled to provide air to the nozzles 26 by suitable control valves 29 and 30. It can be seen, therefore, that the wheels 24 and 25 will be rotated in response to the air escaping through the nozzles 26 and 27 and striking the air wheels 24 and 25 when the control valves 29 and 30 are opened in response to a control such as a timing device or radio control (not shown). The speed of rotation of the cylindrical mass 2 while positioned on the rotating spindles 18 and 19 is regulated by the air jets from the nozzles 26 and 27 and the governor 4 located on the cylindrical mass 2.

Following ejection of the nose-cone 14, the cylinder 2 is accelerated outwardly away from the rocket 13 by the explosive discharges at the positions 23 in the tracks 21 and 22 with the discharges triggered by any suitable means such as ejection of the nose-cone or radio signals (not shown).

In response to the discharges at positions 23, the arms 16 and 17 are slidably moved outwardly in the tracks 21 and 22 and thrown back to the dotted positions shown in FIGURE 3 by their own resilience or through a suitable guide means (not shown).

It should be obvious that this method of providing rotation and positioning of the cylindrical mass 2 is only one of many possible launching techniques that could be provided.

While there has been described what is at present considered the preferred embodiment of the invention, it will be obvious to those skilled in the art that various changes and modifications may be made therein without departing from the invention.

What is claimed is:
1. An element dispensing means comprising:
 solid binder means capable of changing state directly to a gas when subjected to the sun's ray and low atmospheric pressure;
 a plurality of elements of different material than said binder means contained within said binder means for release by said binder means when said binder means changes from its solid to its gaseous state;
 means for causing said solid binder means to spin; and
 control means for controlling spin velocity of said solid binder means.
2. A radio signal reflector dispensing means comprising:
 solid binder means which is a stable solid in the atmosphere close to the earth and which sublimes when subjected to the sun's rays and low atmospheric pressure;
 a plurality of elements of different material than said binder means contained within said binder means for release by said binder means when said binder means changes from its solid to its gaseous state;
 means for causing said solid binder means to spin; and
 control means for controlling spin velocity of said binder means.
3. An element dispensing means comprising:
 solid binder means capable of changing state directly to a gas when subjected to the sun's rays and low atmospheric pressure;
 a plurality of elements of different material than said binder means contained within said binder means for release by said binder means when said binder means sublimes from its solid to its gaseous state; and
 means for effecting controlled movement of said elements away from the remaining binder means and elements.
4. An element dispensing means comprising:
 solid binder means capable of changing state directly to a gas when subjected to the sun's rays and low atmospheric pressure;
 a plurality of elements of different material than said binder means contained within said binder means for release by said binder means when said binder means changes from its solid to its gaseous state;
 means for placing said binder means into an orbit about a celestial body;
 means for causing said binder means to spin; and
 control means for controlling spin velocity of said solid binder means, said spin velocity imparting mass surface tangential velocity to said elements released by the sublimation of said binder means such that each of said elements establishes a separate orbit, said tangential velocity establishing a maximum limit of spread between said separate orbits.
5. An element dispensing means comprising:
 solid binder means capable of changing state directly to a gas when subjected to the sun's rays and low atmospheric pressure;
 a plurality of element means of different material than said binder means suspended throughout said binder means for release by said binder means when said binder means changes from its solid to its gaseous state;

means for placing said binder means into an orbit about a celestial body; and means for causing said binder means to spin.

6. An element dispensing means comprising:

solid binder means capable of changing state to a gas when subjected to the sun's rays and low atmospheric pressure;

a plurality of radio signal reflector means of different material than said binder means suspended throughout said binder means for release by said binder means when said binder means changes from its solid to its gaseous state;

means for causing said solid binder means to spin; and control means for controlling spin velocity of said solid binder means.

7. A radio signal reflector dispensing means comprising:

solid binder means which is a stable solid in the atmosphere close to the earth and which sublimes when subjected to the sun's rays and low atmospheric pressure;

a plurality of radio signal reflector means suspended throughout said binder means for release by said binder means when said binder means changes from its solid to its gaseous state;

means for causing said solid binder means to spin; and control means for controlling spin velocity of said binder means.

8. A radio signal reflector dispensing means comprising:

solid binder means capable of changing state to a gas when subjected to the sun's rays and low atmospheric pressure;

a plurality of radio signal reflector means suspended throughout said binder means for release by said binder means when said binder means sublimates from its solid to its gaseous state; and means for imparting controlled movement to said reflector means with sublimation of a surface area releasing the reflector means while the remaining reflector means are secured by the remaining binder means in its solid state.

9. A radio signal reflector dispensing means comprising:

solid binder means capable of changing state to a gas when subjected to the sun's rays and low atmospheric pressure;

a plurality of radio signal reflector means suspended throughout said binder means for release by said binder means when said binder means changes from its solid to its gaseous state;

means for placing said binder means into an orbit about a celestial body;

means for causing said solid binder means to spin; and control means for controlling spin velocity of said solid binder means, said spin velocity imparting mass surface tangential velocity to said reflector means released by the sublimation of said binder means such that each of said reflector means establishes a separate orbit, said tangential velocity establishing a maximum limit of spread between said separate orbits.

10. The system as defined by claim 9 wherein each of said radio signal reflector means comprises:

a dipole radio wave reflector.

References Cited by the Examiner

UNITED STATES PATENTS

| | | | |
|---|---|---|---|
| 2,580,921 | 1/1952 | Iams | 343—18 |
| 2,752,594 | 6/1956 | Link et al. | 343—18 |
| 2,797,844 | 7/1957 | Meek | 239—60 |
| 2,871,344 | 1/1959 | Busignies | 343—18 |
| 2,954,935 | 10/1960 | Stearns et al. | 222—394 X |

OTHER REFERENCES

Carey, Frank: "Wire Net 1000 Miles Up Gets Kennedy Approval," The Washington Post (Washington, D.C.), Aug. 12, 1961, page A1.

Kornberg, Warren: "Global Communication Program to Use Metal Particles in Orbit," The Washington Post (Washington, D.C.), Sept. 9, 1960, page A3.

Langmuir et al.: "Meteorological Research," First Quarterly Progress Report, March 1–June 1, 1947, Office of Technical Services, Dept. of Commerce, Washington, D.C., PB81842, QC922, M4, pages 21, 25, and 27 relied on.

Simons, Howard: "Suspected Contact With Orbiting Can Deepens Mystery of Space Filaments," The Washington Post (Washington, D.C.), Nov. 11, 1961, page A1.

CHESTER L. JUSTUS, *Primary Examiner.*

FREDERICK M. STRADER, KATHLEEN CLAFFY,
*Examiners.*